United States Patent
Li et al.

(10) Patent No.: US 9,367,715 B2
(45) Date of Patent: Jun. 14, 2016

(54) SYSTEM FOR NON-CONTACT ID IDENTIFICATION AND ID CARD USING THE SAME

(71) Applicant: Generalplus Technology Inc., Hsinchu (TW)

(72) Inventors: Hsien-Yao Li, Hsinchu (TW); Li Sheng Lo, Zhubei (TW); Tung-Tsai Liao, Hsinchu (TW)

(73) Assignee: Generalplus Technology Inc., Hsinchu (TW)

( * ) Notice: Subject to any disclaimer, the term of this patent is extended or adjusted under 35 U.S.C. 154(b) by 0 days.

(21) Appl. No.: 14/454,195

(22) Filed: Aug. 7, 2014

(65) Prior Publication Data
US 2015/0302226 A1 Oct. 22, 2015

(30) Foreign Application Priority Data
Apr. 18, 2014 (TW) .............................. 103114257 A

(51) Int. Cl.
*G06K 7/08* (2006.01)
*G06K 19/077* (2006.01)
*G06F 3/00* (2006.01)
*G06K 19/067* (2006.01)

(52) U.S. Cl.
CPC .. *G06K 7/08* (2013.01); *G06F 3/00* (2013.01); *G06K 19/067* (2013.01); *G06K 19/07745* (2013.01); *G06K 19/07749* (2013.01)

(58) Field of Classification Search
CPC .............. G06K 7/08; G06K 19/07745; G06K 19/07749
USPC .................................................. 235/491, 451
See application file for complete search history.

(56) References Cited

U.S. PATENT DOCUMENTS

| | | | |
|---|---|---|---|
| 3,716,701 A * | 2/1973 | Cohen .................. | G06K 19/067 235/451 |
| 5,949,060 A * | 9/1999 | Schattschneider ... | G06K 19/067 235/382 |
| 2015/0136853 A1* | 5/2015 | Palmer ................. | G06K 19/067 235/451 |

FOREIGN PATENT DOCUMENTS

EP          2418607 A1          2/2012

* cited by examiner

*Primary Examiner* — Toan Ly
(74) *Attorney, Agent, or Firm* — Muncy, Geissler, Olds & Lowe, P.C.

(57) ABSTRACT

A system for identifying identity (ID) and an ID card using the same are provided in the present invention. The ID card utilizes a specific ID reader to identify the ID of the ID card. The ID card includes a card case, a plurality of disposing positions for electrodes and at least a specific conductor electrode. The disposing positions are disposed in the card case. The specific conductor electrode(s) is/are disposed on at least one of the disposing positions according to the ID of the ED card. The specific card reader includes a flat panel sensor. When the ID card is close to the flat panel sensor of the card reader, the flat panel sensor senses the position of the conductor electrode(s) to determine the ID of the ID card.

12 Claims, 12 Drawing Sheets

SYSTEM FOR NON-CONTACT ID IDENTIFICATION AND ID CARD USING THE SAME

This application claims the benefit of TW Application No. 103114257 filed on Apr. 18, 2014, the content of which is hereby incorporated by reference.

BACKGROUND OF THE INVENTION

1. Field of Invention

The present invention relates in general to a non-contact ID recognition technology, and more particularly to a system for identifying identity (ID) and an ID card using the same.

2. Related Art

With the progress of the technology and the development of the electrical identity, identity recognition systems are configured in a part of the public institutions, offices, laboratories, elevators, cars and so on, based on the confidentiality and the security reasons. The identity recognition system is used for detecting the ID card such that the person who has the correct ID card can enter. In addition, many shopping centers, playgrounds or public places may have arcade game machines, which kids are favorite game. The arcade game machines need its specific ID card to play. The ID card should be inserted to the arcade game machines to wait the machine to identify, and then the game machine would determine its combat capability, and then the game player can play the game by the ID card.

In present, the most identifications of identity adopt RFID (Radio Frequency Identification) or magnetic stripe. RFID uses radio wave to transmit the tag in the card to perform data transmission and identification. Since the RFID card is implemented by at least a winding and an IC with arithmetic function, the RFID card has higher production cost. The magnetic stripe ID card uses the magnetic strip to store information. The magnetic stripe of the ID card need to physically contact with the magnetic head of the ID card reader. The magnetic stripe should slide through the ID card reader to identify the ID. Since the card reader for magnetic stripe ID card utilizes swiping the ID card by user for data reading, the card reader has to have the magnetic head and its corresponding mechanism, such that the cost of the card reader is excessively high. And, when the magnetic stripe of the ID card is used for a while, the magnetic stripe may be degaussed.

SUMMARY OF THE INVENTION

It is therefore an objective of the present invention to provide an ID card, wherein a plurality of conductors are disposed in the ID card, wherein the pattern by the electrical connections of the conductors stores an ID in the ID card such that the cost of the ID card can be affectively reduced.

Another objective of the present invention is to provide a system for identifying an ID, wherein the system senses the positions of the conductors or senses the pattern by the electrical connections of the conductors to identify the specific ID of the ID card.

The other objective of the present invention is to provide an ID card. The ID card uses the positions of the conductors in the ID card to represent its ID such that the cost of the ID card can be affectively reduced.

In order to achieve the abovementioned first object of the present invention and other object of the present invention, an ID card is provided in the present invention, wherein the ID of the ID card is read by a card reader, and the ID card includes a card case, a plurality of electrode fixed positions and at least a specific conductor electrode. The electrode fixed positions is disposed on and arranged in the card case. The specific conductor electrode is disposed in at least one electrode fixed position. The position of the specific conductor electrode is determined by an ID of the ID card. The card reader comprises a surface-shaped sensor. When the ID card is close to the card reader, the surface-shaped sensor determines the specific ID of the ID card according to the position of the specific conductor electrode sensed by the surface-shaped sensor.

Another ID card is provided in the present invention, the ID card uses a card reader to identify the ID of the ID card. The ID card includes a card case and a plurality of conductor electrodes. The conductor electrodes is disposed on and arranged in the card case, wherein a plurality of first specific conductor electrodes of the conductor electrodes are electrically connected to each other to represent a specific ID. The card reader comprises a surface-shaped sensor. When the ID card is close to the card reader, the surface-shaped sensor determines the specific ID of the ID card according to the shape configured by the first specific conductor electrodes sensed by the surface-shaped sensor.

A system for identifying ID is provided in the present invention. The system includes at least a ID card and a card reader, The ID card includes a card case and a plurality of conductor electrodes. The conductor electrodes are disposed on and arranged in the card case, wherein a plurality of first specific conductor electrodes of the conductor electrodes are electrically connected to each other to represent a specific ID. The card reader is for performing identification of ID, wherein the card reader includes a surface-shaped sensor. When the ID card is close to the card reader, the surface-shaped sensor determines the specific ID of the ID card according to the shape configured by the first specific conductor electrodes sensed by the surface-shaped sensor.

In the ID card and the system for identifying ID according to a preferred embodiment of the present invention, the ID card further includes a grounding conductor. The first specific conductor electrodes are electrically connected to the grounding conductor. Furthermore, the surface-shaped sensor of the card reader is a surface-shaped capacitive sensor, wherein the surface-shaped capacitive sensor is used for detecting a plurality of capacitances between each of conductors and the surface-shaped capacitive sensor, and accordingly determines the shape configured by the first specific conductor electrodes to determine the specific ID of the ID card.

In the ID card and the system for identifying ID according to a preferred embodiment of the present invention, the conductor electrodes are arranged to a N×M matrix, and the surface-shaped sensor includes a signal transceiver matrix, wherein the signal transceiver matrix includes at least N×M signal transceivers, wherein positions of signal transceivers are corresponding to positions of the conductor electrodes, wherein a detection period is divided into N×M time slots, wherein in the $(i,j)^{th}$ time slot, $(i,j)^{th}$ signal transceiver emits a electric field signal, and the rest of signal transceivers are served as receivers to receive the electric field signal, wherein one of the first conductor electrodes receives the electric field signal, the signal transceivers respectively corresponding to the rest of first conductor electrodes receive the electrical field signal, such that the card reader determines the shape configured by the first conductor electrodes to determine the specific ID of the ID card.

In the ID card and the system for identifying ID according to a preferred embodiment of the present invention, the card reader is a smartphone and the surface-shaped sensor is the touch panel of the smartphone.

The spirit of the present invention is to use the arrangements and/or combinations to form different pattern. The card reader determines the positions or the number of the conductor electrodes in the card through its sensing device, such that the ID of the ID card can be determined. The sensing device may be a capacitive sensor, metal sensor or a electric field sensor. Since it is only to arrange or to combine the conductor electrode(s) in the card to represent the ID, the cost ID card can be reduced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
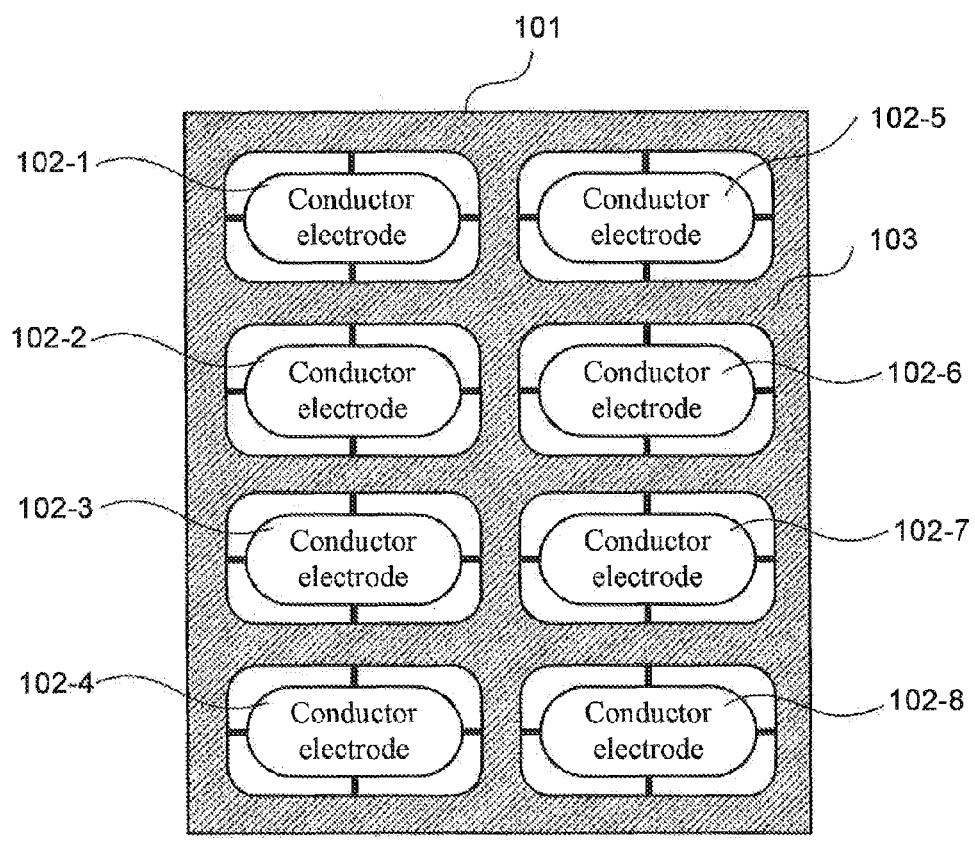
FIG. 1 illustrates a schematic depicting an ID card according to a preferred embodiment of the present invention.

FIG. 1 illustrates a schematic depicting an ID card according to a preferred embodiment of the present invention. Referring to FIG. 1, the ID card includes a card case 101, a plurality of conductor electrodes 102-1~102-8 and a grounding conductor 103. The grounding conductor 103 may distribute in the card, as shown in the slash area in FIG. 1. The conductor electrodes 102-1~102-8 is arranged in the card case 101. There are four conductor line around each of conductor electrodes 102-1~102-8. As shown in FIG. 1, the conductor electrodes 102-1~102-8 are all electrically connected to the grounding conductor 103.

Figure 2A:
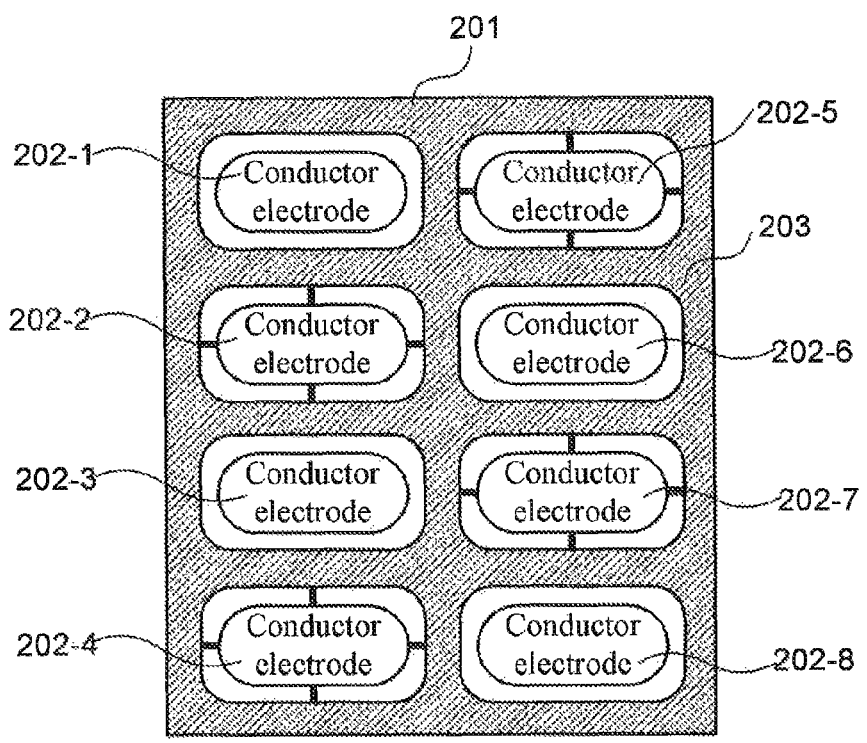
FIG. 2A illustrates a schematic depicting an ID card with a specific ID according to a preferred embodiment of the present invention.
Figure 2B:
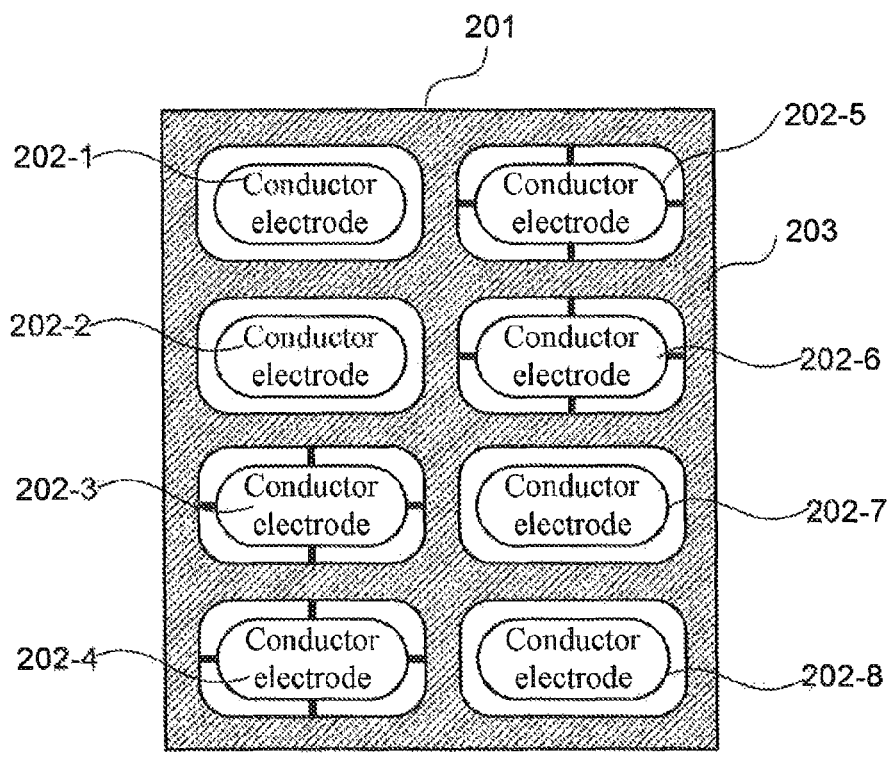
FIG. 2B illustrates a schematic depicting an ID card with a specific ID according to a preferred embodiment of the present invention.

In the abovementioned FIG. 1, it can be considered as a non-setting ID card. When setting the ID of the card, manufacturer or designer can just remove the unnecessary conductor line(s), and the ID card with different ID can be done. As shown in FIG. 2A and FIG. 2B. FIG. 2A illustrates a schematic depicting an ID card with a specific ID according to a preferred embodiment of the present invention. FIG. 2B illustrates a schematic depicting an ID card with a specific ID according to a preferred embodiment of the present invention. Referring to FIG. 2A and FIG. 2B, Similarly, the ID card includes a card ease 201, a plurality of conductor electrodes 202-1~202-8 and a grounding conductor 203. In FIG. 2A and FIG. 2B, it can be seen that there are only four conductor electrodes in the conductor electrodes 202-1~202-8 to electrically connect to the grounding conductor 203. Since electrical connection between the conductor electrodes in FIG. 2A and the conductor electrodes in FIG. 2B is different, they are respectively represented different IDs. For example, assuming each conductor electrode 202-1~202-8 is respectively represented a bit. The conductor electrode 202-1 represents the Most Significant Bit (MSB). The conductor electrode 202-8 represents the Least Significant Bit (LSB). The binary ID of the ID card in FIG. 2A in this embodiment is "01011010", and the binary ID of the ID card in FIG. 2B in this embodiment is "00111100".

In the abovementioned embodiment, the advantage of the ID card is the cost is extremely cheap, and it is ease of mass production. For example, the ID card can be implemented by a Print Circuit Board (PCB) for mass production.

Figure 3A:
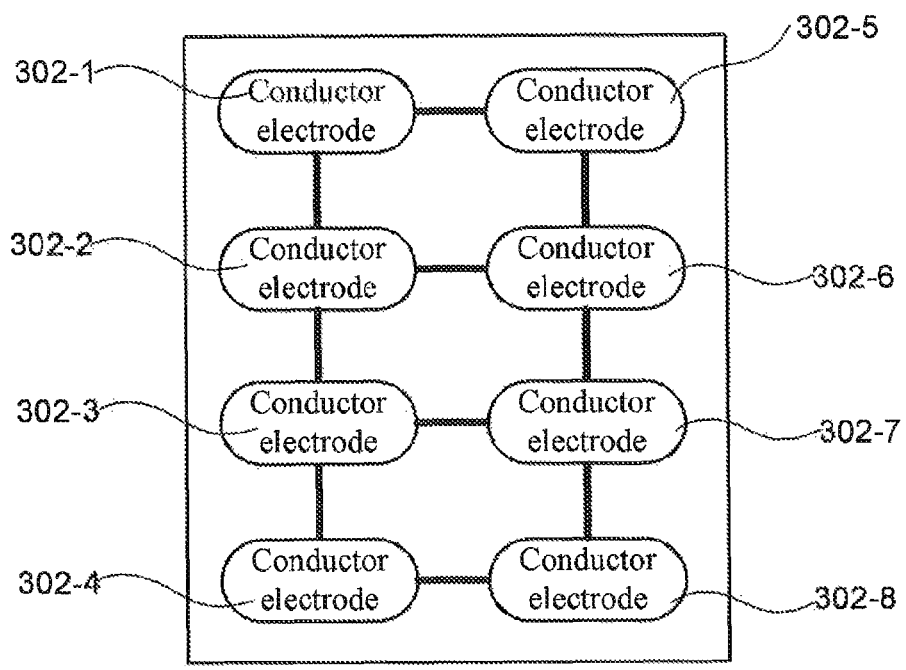
FIG. 3A illustrates a schematic depicting an ID card with a specific ID according to a preferred embodiment of the present invention.
Figure 3B:
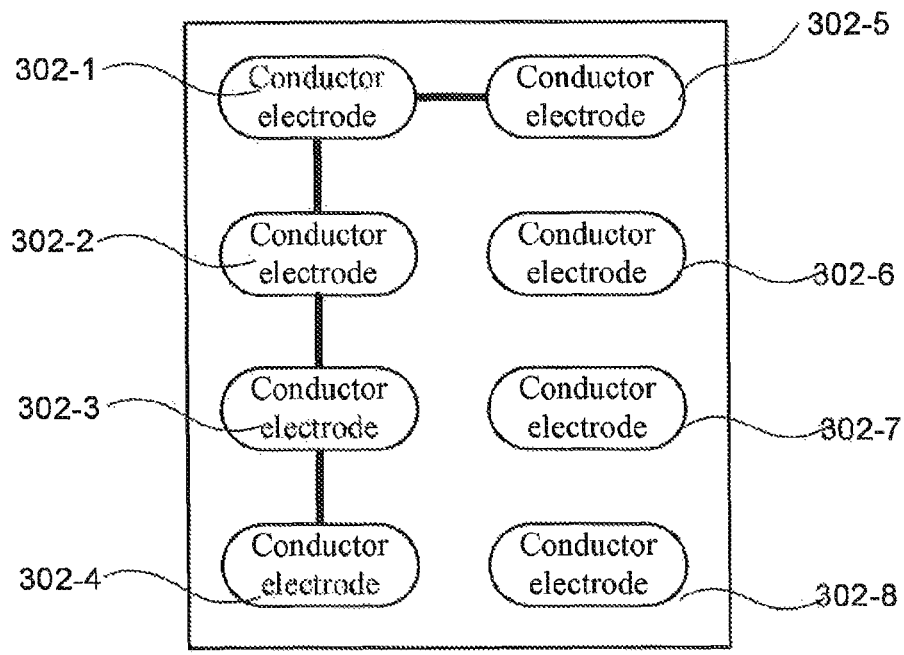
FIG. 3B illustrates a schematic depicting an ID card with a specific ID according to a preferred embodiment of the present invention.

The abovementioned embodiment in FIG. 2A and FIG. 2B adopts the electrical connection between the conductor electrodes 202-1~202-8 and the grounding conductor 203 to determine the ID of ID card. In another preferred embodiment, the ID card may not adopt the grounding conductor 203. It only uses the electrical connection between the conductor electrodes 202-1~202-8 to determine the ID of the ID card. As shown in FIG. 3A and FIG. 3B, FIG. 3A illustrates a schematic depicting an ID card with a specific ID according to a preferred embodiment of the present invention. FIG. 3B illustrates a schematic depicting an ID card with a specific ID according to a preferred embodiment of the present invention. Referring to FIG. 3A, each of the conductor electrodes 302-1~302-8 is connected with one another by the upper conductor line, lower conductor line, right side conductor line and left side conductor line, which is respectively represented as a specific M. In addition, in the ID card depicted in FIG. 3B, only five conductor electrodes 302-1~302-5 are electrically connected to each other, which represent another ID. In the abovementioned FIG. 2A, FIG. 2B, FIG. 3A and FIG. 3B, the electrical connection between the conductor electrodes are by the horizontal conductor line or the vertical conductor line. However, people having ordinary skill in the art should know that the type of the conductor line, the shape of the conductor line or the position of the conductor line can be changed according to design. The conductor line may be a slash line or curve line. Thus the present invention is not limited thereto. Further, the present invention is not limited the number of the conductor line around each conductor electrode.

Figure 4A:
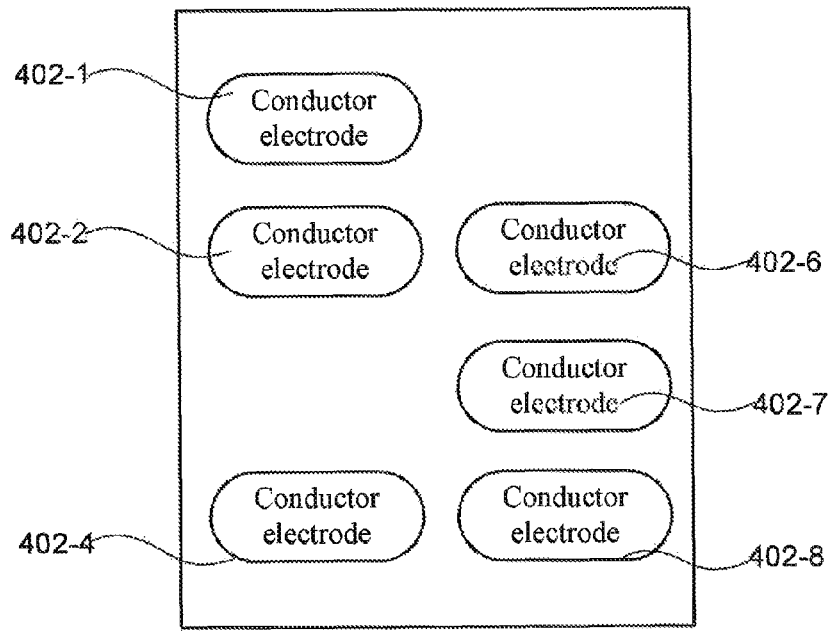
FIG. 4A illustrates a schematic depicting an ID card with a specific ID according to a preferred embodiment of the present invention.
Figure 4B:
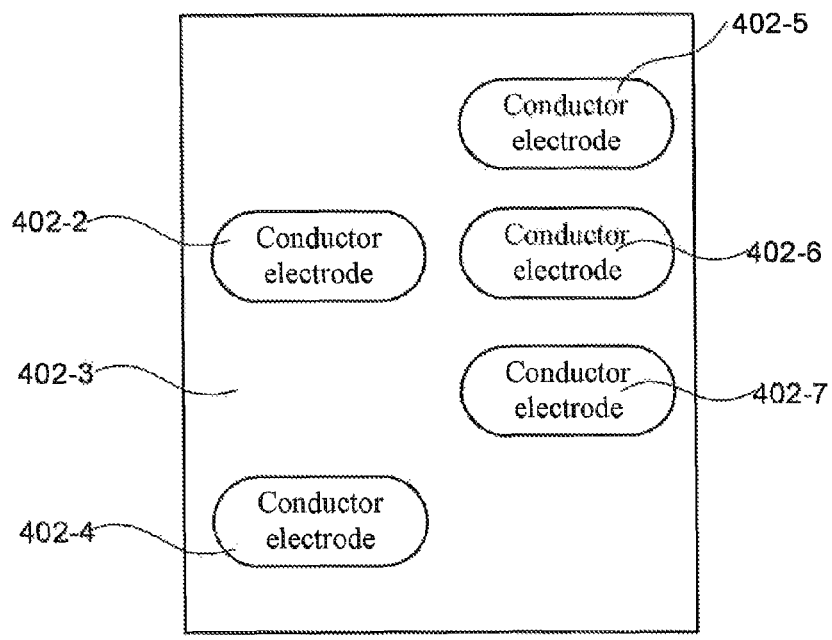
FIG. 4B illustrates a schematic depicting an ID card with a specific ID according to a preferred embodiment of the present invention.

In another preferred embodiment of the present invention, the ID card may not use the grounding conductor and the conductor line. The ID of the ID card is represented by the position(s) of the conductor electrode(s), As shown in FIG. 4A and FIG. 4B. FIG. 4A illustrates a schematic depicting an ID card with a specific ID according to a preferred embodiment of the present invention. FIG. 4B illustrates a schematic depicting an ID card with a specific ID according to a preferred embodiment of the present invention. Referring to FIG. 4A and FIG. 4B, different positions of the conductor electrodes represent the different ID. Similarly, assuming each of the positions of the conductor electrodes 402-1~402-8 respectively represent a bit. The conductor electrode 402-1 represents the Most Significant Bit (MSB). The conductor electrode 402-8 represents the Least Significant Bit (LSB). The binary ID of the ID card in FIG. 4A in this embodiment is "11010111", and the binary ID of the ID card in FIG. 4B in this embodiment is "01011110".

In the abovementioned embodiments in FIG. 2A~FIG. 4B, different ID cards are provided as an exemplary example. However, people having ordinary skill in the art should know that the types of the ID card should not be limited in the abovementioned embodiments. For example, the ID card in the abovementioned embodiments all adopts 4×2 conductor electrode matrix, people having ordinary skill in the art should know that the size of the matrix can be changed according to different design. If the ID is represented by the electrical connection between conductor electrodes and the grounding conductor, or by the electrical connection between conductor electrodes, or by the position(s) of conductor electrode(s), the ID card is in the scope of the present invention. Thus, the present invention is not limited thereto.

Figure 5A:
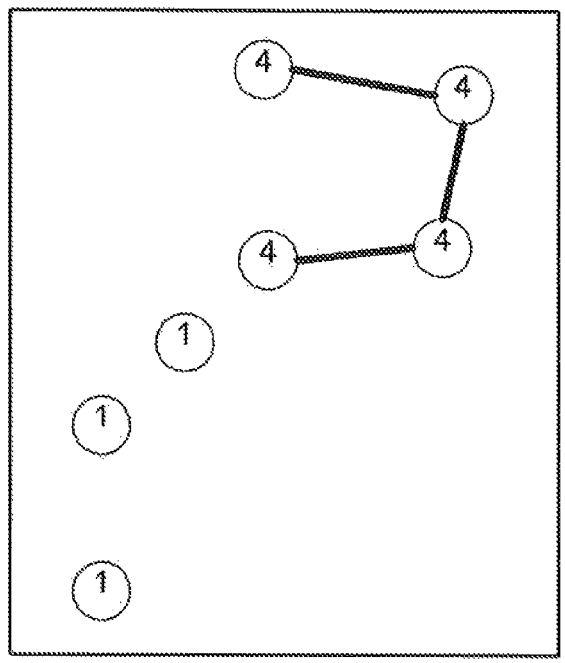
FIG. 5A illustrates a schematic depicting an ID card with a specific ID according to a preferred embodiment of the present invention.
Figure 5B:
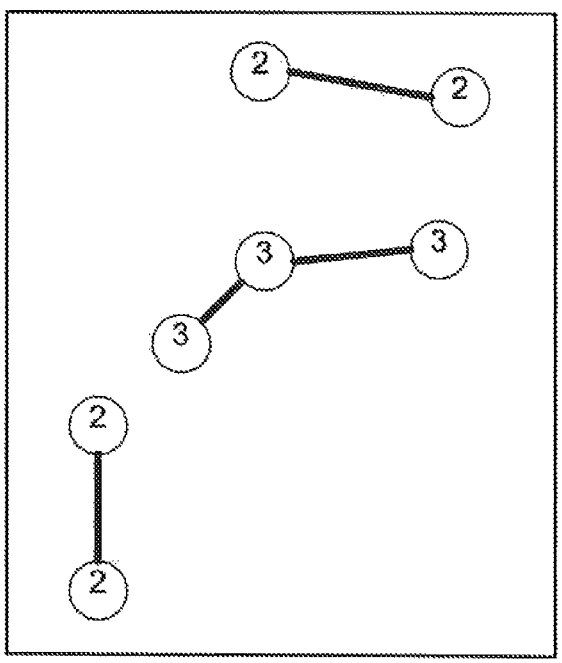
FIG. 5B illustrates a schematic depicting an ID card with a specific ID according to a preferred embodiment of the present invention.

Further, in the abovementioned embodiments in FIG. 2A~FIG. 4B, the arrangement of the conductor electrodes is a rectangular matrix, and people having ordinary skill in the art should know that the arrangement of the conductor electrodes can be changed according to design. In this embodiment, another type ID card is provided. As shown in FIG. 5A and FIG. 5B, FIG. 5A illustrates a schematic depicting an ID card with a specific ID according to a preferred embodiment of the present invention. FIG. 5B illustrates a schematic depicting an ID card with a specific ID according to a preferred embodiment of the present invention. Each circle represents a conductor electrode, the conductor electrodes forms a big dipper array. In this embodiment, the shape and the electrical connection can be designed by user or manufacturer to increase interestingness and degree of recognition. Also, the ID can be represented by the electrical connection between the conductor electrodes.

Moreover, the abovementioned ID cards are rectangular, people having ordinary skill in the art should know that the ID card can be designed as a oval or square, and so on. Thus, the present invention is not limited thereto. Further, in order that the card case does not affect the physical properties of the conductor electrodes, the material of the card case may adopt the plastic or paper.

Figure 6:
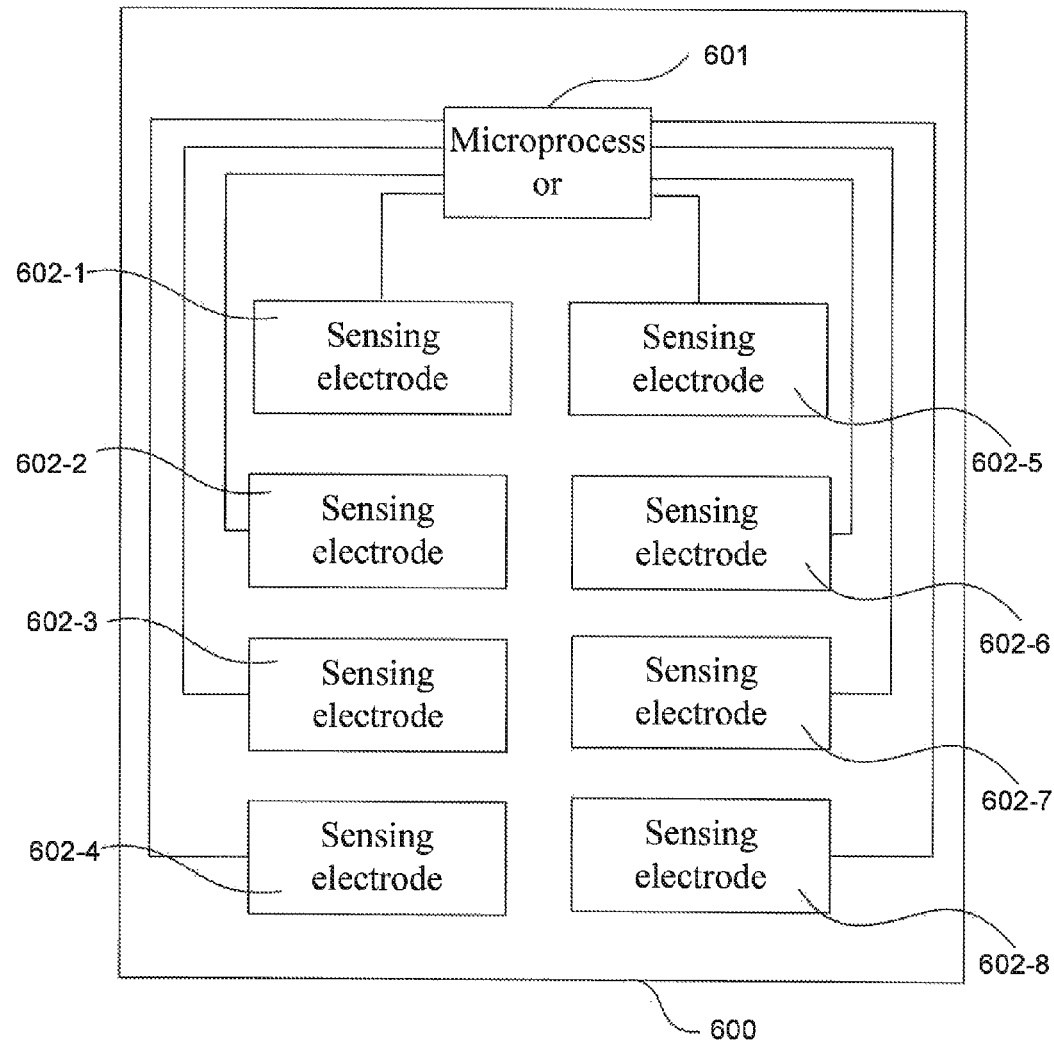
FIG. 6 illustrates a circuit block diagram depicting a card reader according to a preferred embodiment of the present invention.

In order that people having ordinary skill in the art can implement the present invention through the present embodiment, in the following embodiment, a card reader for identifying the IDs of the ID card in FIG. 2A~FIG. 4B is provided. FIG. 6 illustrates a circuit block diagram depicting a card reader according to a preferred embodiment of the present invention. Referring to FIG. 6, the card reader 600 includes a plurality of sensing electrodes 602-1~602-8 and a microprocessor 601, wherein the card reader may includes a surface-shaped sensor, and the sensing electrodes 602-1~602-8 are distributed to the surface-shaped sensor for sensing conductor electrodes in ID card on the surface of the surface-shaped sensor. When the card reader 600 performs identification of ID card, since the positions of the sensing electrodes 602-1~602-8 is corresponding to the positions the conductor electrodes 102-1~102-8, the microprocessor 601 receives the detection results from every sensing electrodes 602-1~602-8 to determine the electrical connection of the conductor electrodes.

In the present embodiment, the detection method of the card reader may be a capacitive sensing, electromagnetic sensing or electric field sensing, and so on. If the method can identify the electrical connection of the conductor electrodes, the method can be adopted in the card reader of the present invention. In order to conveniently describe the identification of ID by the card reader, it is assumed that the detection method of the card reader adopts the capacitive sensing method.

Figure 7:
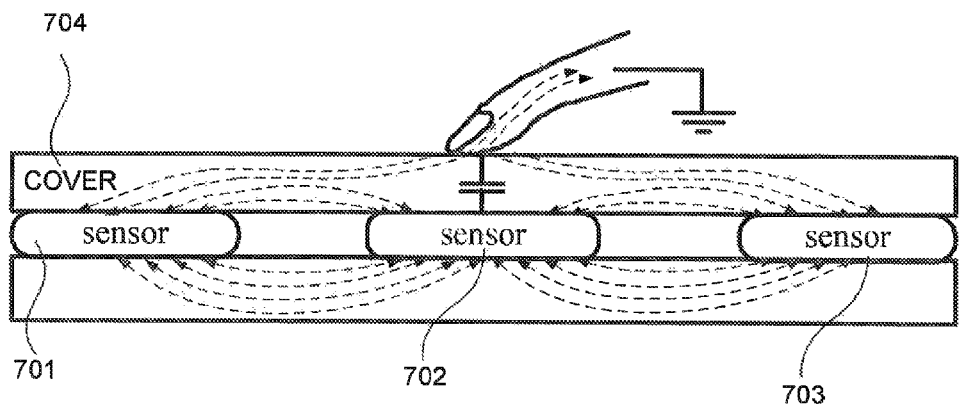
FIG. 7 illustrates a schematic depicting a capacitive sensor according to the conventional art.

Conventional capacitive touch sensing is that the touch sensor pad would detect the variation of capacitance by the sensing electrode when user's finger is close to the sensing electrode. The rear end circuit of the sensing electrode determines whether the user's finger touches the sensing electrode by the detection result of the variation of capacitance by the sensing electrode. As shown in FIG. 7, FIG. 7 illustrates a schematic depicting a capacitive sensor according to the conventional art. Referring to FIG. 7, the labels 701, 702 and 703 are sensors. There is an insulation material 704 on the sensor. When user's finger is close, the human body can be seen as a grounding conductor, which changes the capacitance.

Figure 8:
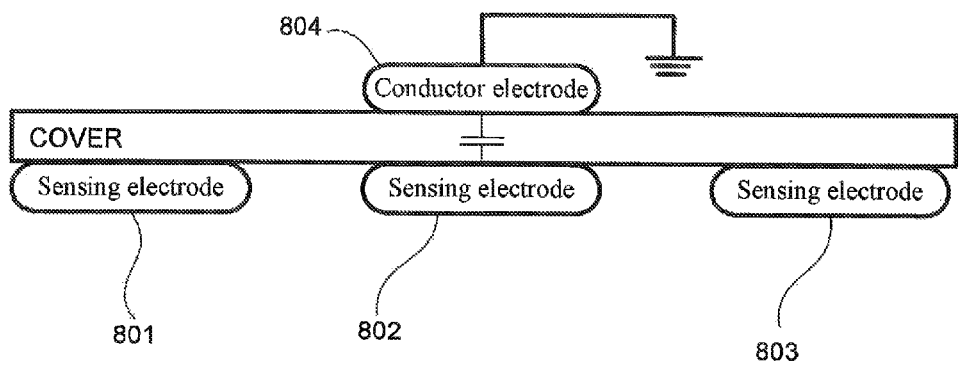
FIG. 8 illustrates a schematic depicting a capacitive sensing method according to a preferred embodiment of the present invention.

In this embodiment, the capacitive sensing technique is adopted to implement the detection of ID of the ID card. FIG. 8 illustrates a schematic depicting a capacitive sensing method according to a preferred embodiment of the present invention. Referring to FIG. 8, the elements 801~803 are the sensing electrodes of the card reader 600 in this embodiment. The element 804 is the conductor electrode of the ID card. When a grounded conductor electrode 804 is close to the sensing electrodes 801~803, there is a sensing capacitance between the conductor electrode and the sensing electrodes 801~803. Referring to FIG. 6 and FIG. 2A, when the card reader 600 read the ID card as shown in FIG. 2A, there are greater sensing capacitances respectively between the grounded conductor electrodes 202-2, 202-4, 202-5 and 202-7 and the sensing electrodes 602-2, 602-4, 602-5 and 602-7. Thus, the specific ID of the ID card in FIG. 2A can be determined by the microprocessor 601.

In the abovementioned embodiment, the card reader includes 4×2 sensing electrodes 602-1~602-8. However, people having ordinary skill in the art should know that card reader can detect the ID card having 4×2 conductor electrodes if the card reader includes more than 4×2 sensing electrodes. In other words, the card reader may have 10×10 sensing electrodes. Since the detection method is similar, the detail description thereof is omitted.

Figure 9:
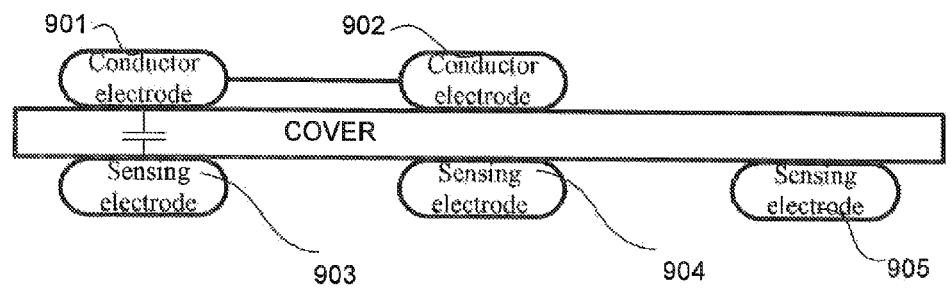
FIG. 9 illustrates a schematic depicting a capacitive sensing method according to a preferred embodiment of the present invention.

FIG. 9 illustrates a schematic depicting a capacitive sensing method according to a preferred embodiment of the present invention. Referring to FIG. 9, the elements 901 and 902 are the conductor electrodes of the ID card, and the conductor electrode 901 is electrically connected to the conductor electrode 902, The elements 903, 904 and 905 are the sensing electrodes of the card reader. When the electrically connecting conductor electrodes 901 and 902 are close to the sensing electrodes 903 and 904, there are sensing capacitance between the electrically connecting conductor electrode and the sensing electrode. The effect is the same as the effect in FIG. 8, However, the conductor electrode 901 and the conductor electrode 902 are usually very thin metal, the sensing error may occur when the sensitivity of the sensing electrodes are not enough or the conductor electrodes 901 and 902 are too thin or too small. However, if the sensitivity of the sensing electrodes is increased, the misjudgment of the card reader may occur, such as the interference by user's finger. In the present embodiment, the time division multiplexing detection method is provided. When the sensing electrode 904 detects the capacitance, the sensing electrodes 903 and 905 are in an idle state. At this time, the microprocessor of the card reader set the sensing electrodes 903 and 905 to the logic low voltage. Meanwhile, the low voltage sensing electrode 903 would form the capacitive effect with the conductor electrode 901. Thus, the sensing electrode 904 can detect greater capacitance. In other word, if the idle sensing electrodes 903 and 905 are grounded, the activated sensing electrode 904 can detects greater capacitance, and it is unnecessary to increase the sensitivity of the sensing electrode. The misjudgment of the sensing electrode can be affectively prevented.

Therefore, the microprocessor 601 of the card reader 600 also can detect capacitances from every sensing electrodes 602-1~602-8 at the same time, and the microprocessor 601 of the card reader 600 can also adopt the time division multiplexing detection method to detect capacitances from every sensing electrodes 602-1~602-8. For example, when the capacitance is detected from the sensing electrode 602-1, the other sensing electrodes 602-2~602-8 are in idle state. Next, when the capacitance is detected from the sensing electrode 602-2, the other sensing electrodes 602-1, 602-3~602-8 are in idle state, and the like. The capacitances is sequentially detected by the sensing electrodes 602-3~602-8. During detecting the capacitance corresponding to each sensing electrodes, if the detected capacitance is greater than a threshold, the detected result would be "1", on the contrary, the result would be "0". Taking the ID card in FIG. 3B as an example, the detected ID would be "11111000".

Since the sensing capacitance sensed from the conductor electrodes may be too small when the card reader reads the ID. Taking the ID card in FIG. 3B as an example, the internal conductor does not be connected to a grounding conductor, it causes that the sensing capacitance sensed by the card reader may be too small. That would be easily cause false detection or misjudgment of ID. However, the time division multiplexing detection method and grounding the idle sensing electrodes would make each detected capacitance greater, and the detected capacitance is not easy to be interfered by the surrounding environment, such as the interference of a user's finger, thus the detection accuracy is increased.

In order to divide different ID card for different application or determine the authenticity of the identification card, the card reader can be designed that one or more sensing electrodes are always grounded. For example, it is assumed that the sensing electrode 602-1 of the card reader is grounded by design. The conductor electrode 302-1 of the ID card is corresponding to the sensing electrode 602-1. The ID card must design at least one of conductor electrode to electrically connect to the conductor electrode 302-1 according to different ID, as shown in FIG. 3A and FIG. 3B. Taking the ID card shown in FIG. 3B as an example, when the ID card is read, since the sensing electrode 602-1 is designed in idle, the capacitances detected by the sensing electrodes 602-2~602-5 would be apparently higher than the capacitances detected by the sensing electrodes 602-6~602-8. When someone unscrupulous trying to crack the ID card, it would be difficult to succeed since he/she does not know the position of the conductor electrode corresponding to the grounded sensing electrode. In addition, the card reader can determine that a card is with an unqualified ID when the card reader detects there is no conductor electrodes electrically connected to the conductor electrode 302-1.

Figure 10A:
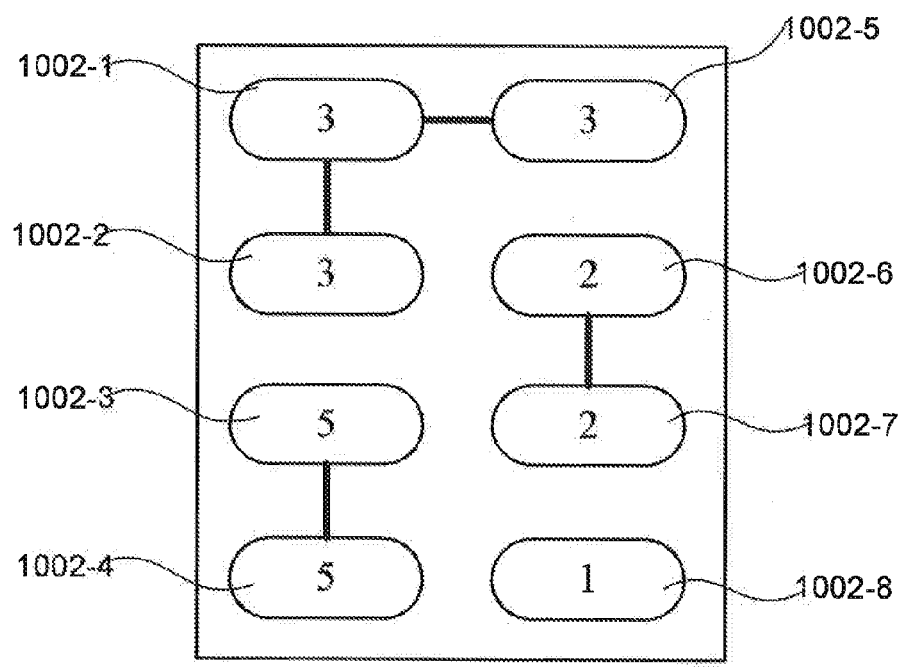
FIG. 10A illustrates a schematic depicting an ID card according to a preferred embodiment of the present invention.
Figure 10B:
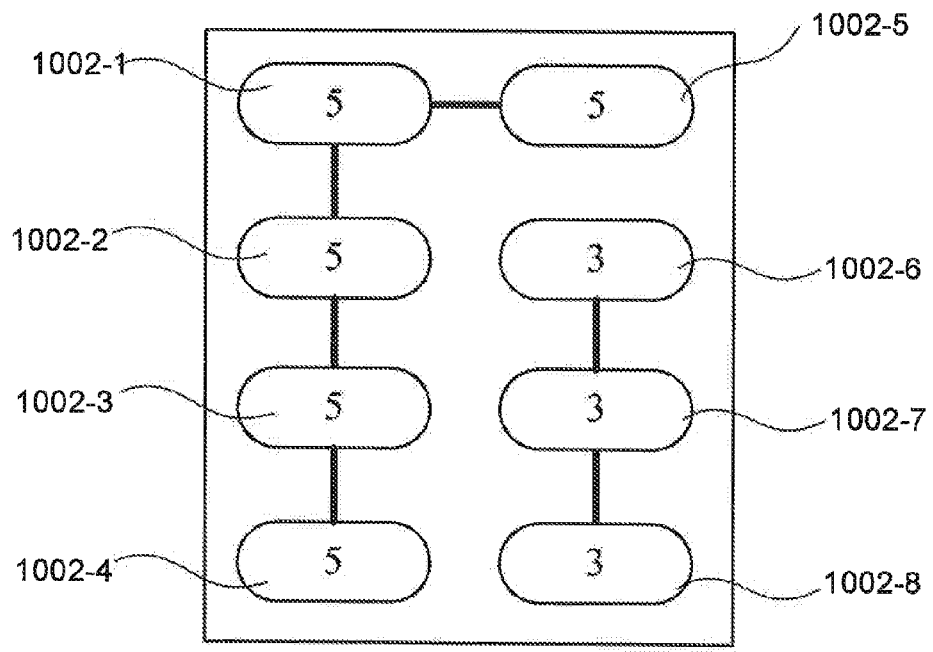
FIG. 10B illustrates a schematic depicting an ID card according to a preferred embodiment of the present invention.

In the abovementioned embodiment, the card reader is used for determining whether capacitance sensed from the conductor electrodes is greater than a threshold to determine the binary of ID. However, the sensing electrode is not only for detecting the threshold, but also for detecting the value of the capacitance. FIG. 10A illustrates a schematic depicting an ID card according to a preferred embodiment of the present invention. Referring to FIG. 10A, the number at each conductor electrode 1002-1~1002-8 represents the capacitance value sensed by the sensing electrode of the card reader. According to the sensed capacitance value, it can determine the raw data of ID of the ID card in FIG. 10A is "33223221". FIG. 10B illustrates a schematic depicting an ID card according to a preferred embodiment of the present invention. Referring to FIG. 10B, similarly, the number at each conductor electrode 1002-1~1002-8 represents the capacitance value sensed by the sensing electrode of the card reader. According to the sensed capacitance value, it can determine the raw data of ID of the ID card in FIG. 10B is "55555333".

Figure 11:
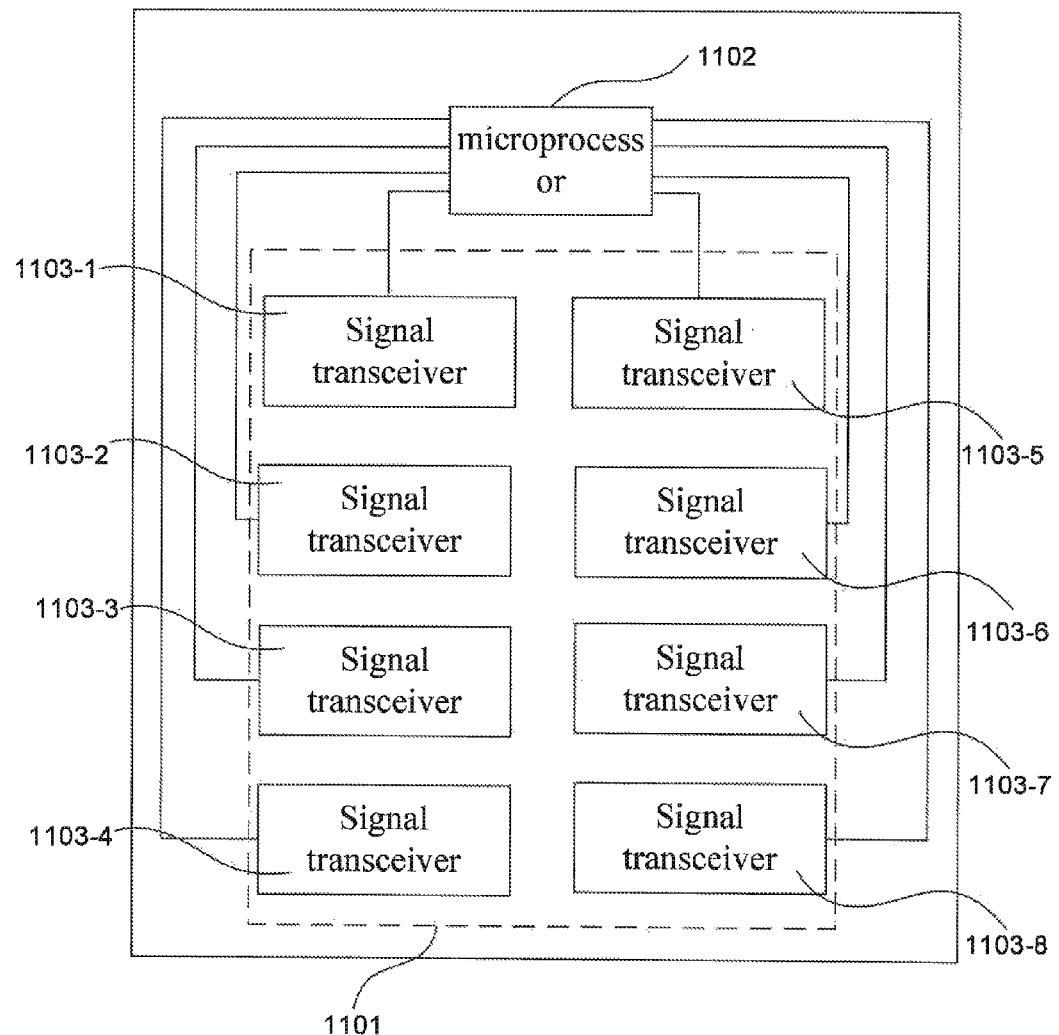
FIG. 11 illustrates a circuit block diagram depicting a card reader according to a preferred embodiment of the present invention.

In order that people having ordinary skill in the art can implement the present invention through the embodiment, the following embodiment provides another implementation of card reader. FIG. 11 illustrates a circuit block diagram depicting a card reader according to a preferred embodiment of the present invention. Referring to FIG. 11, the card reader 1100 includes a signal transceiver matrix 1101 and a microprocessor 1102. The signal transceiver matrix 1101 includes a plurality of signal transceivers 1103-1~1103-8, the coupling relationship thereof is shown in FIG. 11. The positions of signal transceiver 1103-1~4103-8 are corresponding to the positions of the conductor electrodes in the ID card.

Figure 12:
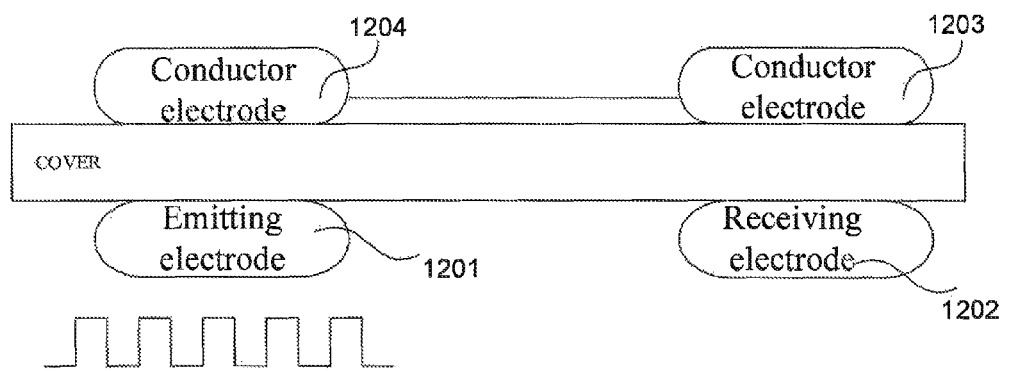
FIG. 12 illustrates a schematic depicting an electric field detection method according to a preferred embodiment of the present invention.

FIG. 12 illustrates a schematic depicting an electric field detection method according to a preferred embodiment of the present invention. Referring to FIG. 12, the emitting electrode 1201 is used for emitting an electric field pulse signal. If the conductor electrode 1203 on the receiving electrode 1202 is electrically connected to the conductor electrode 1204 on the emitting electrode 1201, the receiving electrode 1202 would synchronously receive the electric field pulse signal.

Figure 13:
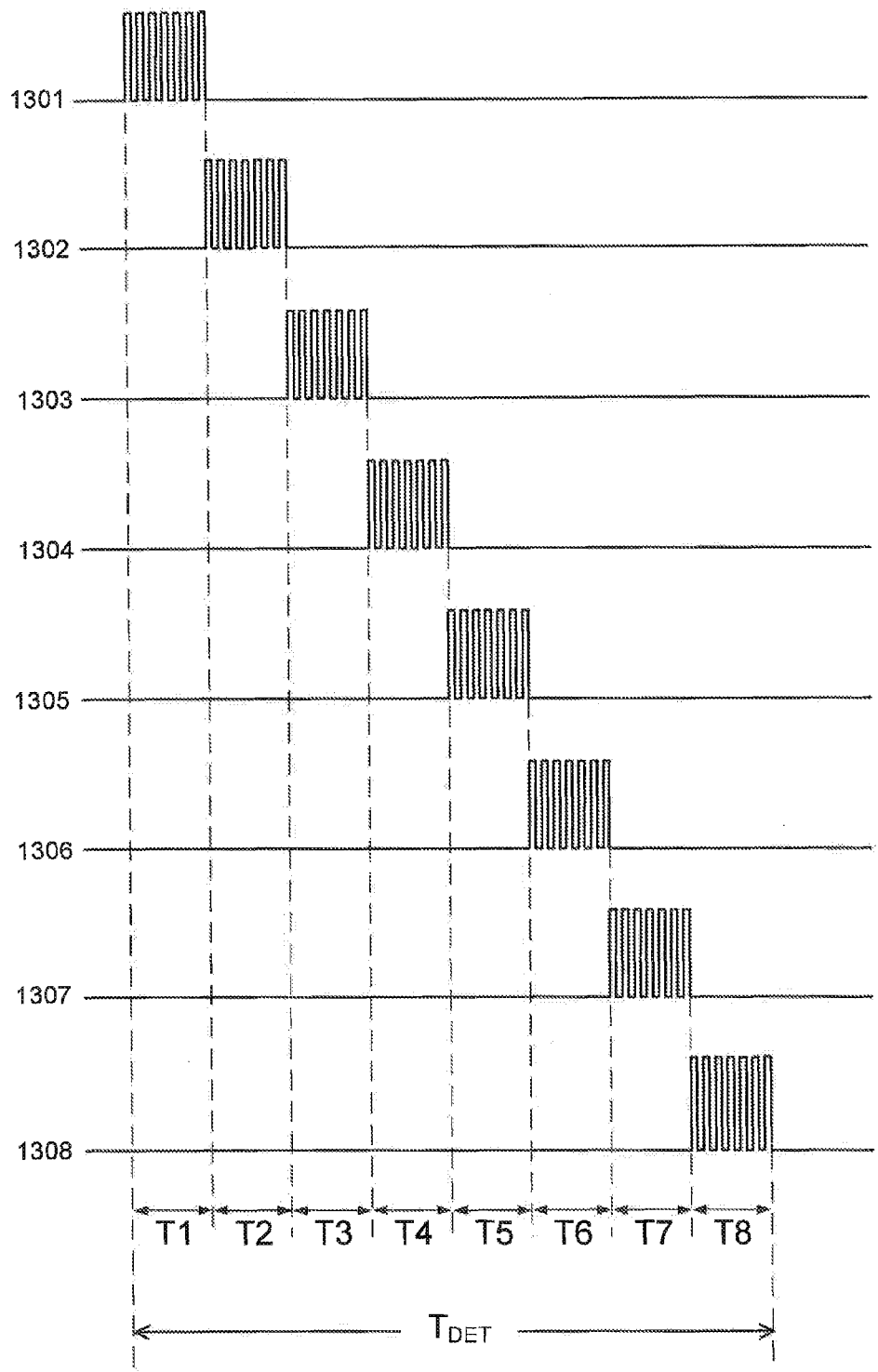
FIG. 13 illustrates a waveform diagram depicting the electric field pulse emitted by the signal transceivers 1103-1~1103-8 according to a preferred embodiment of the present invention.

FIG. 13 illustrates a waveform diagram depicting the electric field pulse emitted by the signal transceivers 1103-1~1103-8 according to a preferred embodiment of the present invention. Referring to FIG. 11 and FIG. 13, the label 1301 represents the waveform emitting by the signal transceiver 1103-1; the label. 1302 represents the waveform emitting by the signal transceiver 1103-2; the label 1303 represents the waveform emitting by the signal transceiver 1103-3; the label 1304 represents the waveform emitting by the signal transceiver 1103-4; the label 1305 represents the waveform emitting by the signal transceiver 1103-5; the label 1306 represents the waveform emitting by the signal transceiver 1103-6; the label. 1307 represents the waveform emitting by the signal transceiver 1103-7; the label 1308 represents the waveform emitting by the signal transceiver 1103-8.

In a first sub-period T1 of a detection period $T_{DET}$, the microprocessor 1102 controls the signal transceiver 1103-1 to emit the electric, field pulse signal, and controls the signal transceivers 1103-2~1103-8 to perform the signal receiving. In a second sub-period T2 of the detection period $T_{DET}$, the microprocessor 1102 controls the signal transceiver 1103-2 to emit the electric field pulse signal, and controls the signal transceivers 1103-1, 1103-3~1103-8 to perform the signal receiving. People having ordinary skill in the art can infer the operations in the other sub-periods T3~T8 through a similar way.

In this embodiment, it is assumed that the card reader detects the ID card in FIG. 10A. Please referring to FIG. 10A, FIG. 11 and FIG. 13, first, the signal transceiver 1103-1 emits the electric field pulse signal. Since the conductor electrodes 1002-1, 1002-2 and 1002-5 are electrically connected to each other, in the first sub-period T1 when the signal transceiver 1103-1 emits the electric field pulse signal, the signal transceivers 1103-2 and 1103-5 would receive the electric field pulse signal. The signal transceivers 1103-3~1103-4 and 1103-6~1103-8 would not receive the electric field pulse signal in the first sub-period T1. The microprocessor 1102 would determine that the conductor electrodes 1002-1, 1002-2 and 1002-5 are electrically connected to each other. Next, in the second sub-period T2, the signal transceiver 1103-2 emits the electric field pulse signal. Since the conductor electrodes 1002-1, 1002-2 and 1002-5 are electrically connected to each other, in the second sub-period T2, the signal transceivers 1103-1 and 1103-5 would receive the electric field pulse signal, and the signal transceivers 1103-3~1103-4 and 1103-6~1103-8 would not receive the electric field pulse signal.

Similarly, in the third sub-period T3, the signal transceiver 1103-4 would receive the electric field pulse signal, and the signal transceivers 1103-1~1103-2 and 1103-5~1103-8 would not receive the electric field pulse signal. In the fourth sub-period 14, the signal transceiver 1103-3 would receive the electric field pulse signal, and the signal transceivers 1103-1~1103-2 and 1103-5~1103-8 would not receive the electric field pulse signal. In the fifth sub-period T5, the signal transceivers 1103-1 and 1103-2 would receive the electric field pulse signal, and the signal transceivers 1103-3~1103-4 and 1103-6~1103-8 would not receive the electric field pulse signal.

Since the conductor electrodes 1002-6 and 1002-7 are electrically connected to each other, in the sixth sub-period T6, the signal transceiver 1103-7 would receive the electric field pulse signal, and the signal transceivers 1103-1~11.03-5 and 1103-8 would not receive the electric field pulse signal. In the seventh sub-period T7, the signal transceiver 1103-6 would receive the electric field pulse signal, and the signal transceivers 1103-1~1103-5 and 1103-8 would not receive the electric field pulse signal. Since the conductor electrode 1002-8 of the ID card in FIG. 10A is not connected to any conductor electrode, the signal transceivers 1103-1~1103-7 would not receive the electric field pulse signal in the eighth sub-period 18.

According to the received signal by the signal transceivers at each sub-period, the microprocessor 1102 determine that the conductor electrodes 1002-1, 1002-2 and 1002-5 are electrically connected to each other, the conductor electrodes 1002-3 and 1002-4 are electrically connected to each other, and the conductor electrodes 1002-6 and 1002-7 are electrically connected to each other. As such, the microprocessor can determine the ID of the ID card.

In the abovementioned embodiment, people having ordinary skill in the art should know that the electric field sensing method is more accurate than the capacitive sensing method. To sensing the thin conductor electrode by the capacitive sensing method, it may not be sensed. If the sensitivity is increased, the misjudgment may occur. In the present embodiment, the electric field sensing method is completely solved the abovementioned problem. In addition, in the abovementioned embodiments, the capacitive sensing method and the electric field sensing method are provided to detect the ID of ID card, people having ordinary skill in the art should know that the electromagnet sensing method can be also adopted in the present invention. If a method can identify conductor's physical characteristic to identify ID of the ID card, the method belongs to the scope of the present invention. Thus, the present invention is not limited thereto.

Similarly, in the abovementioned embodiment, the signal transceiver matrix 1101 includes 4×2 signal transceiver 1103-1~1103-8. However, people having ordinary skill in the art should know that card reader can detect the ID card having 4×2 conductor electrodes if the card reader includes more than 4×2 signal transceivers. In other words, the card reader may have 10×10 signal transceiver. Since the detection method is similar, the detail description thereof is omitted.

Figure 14:
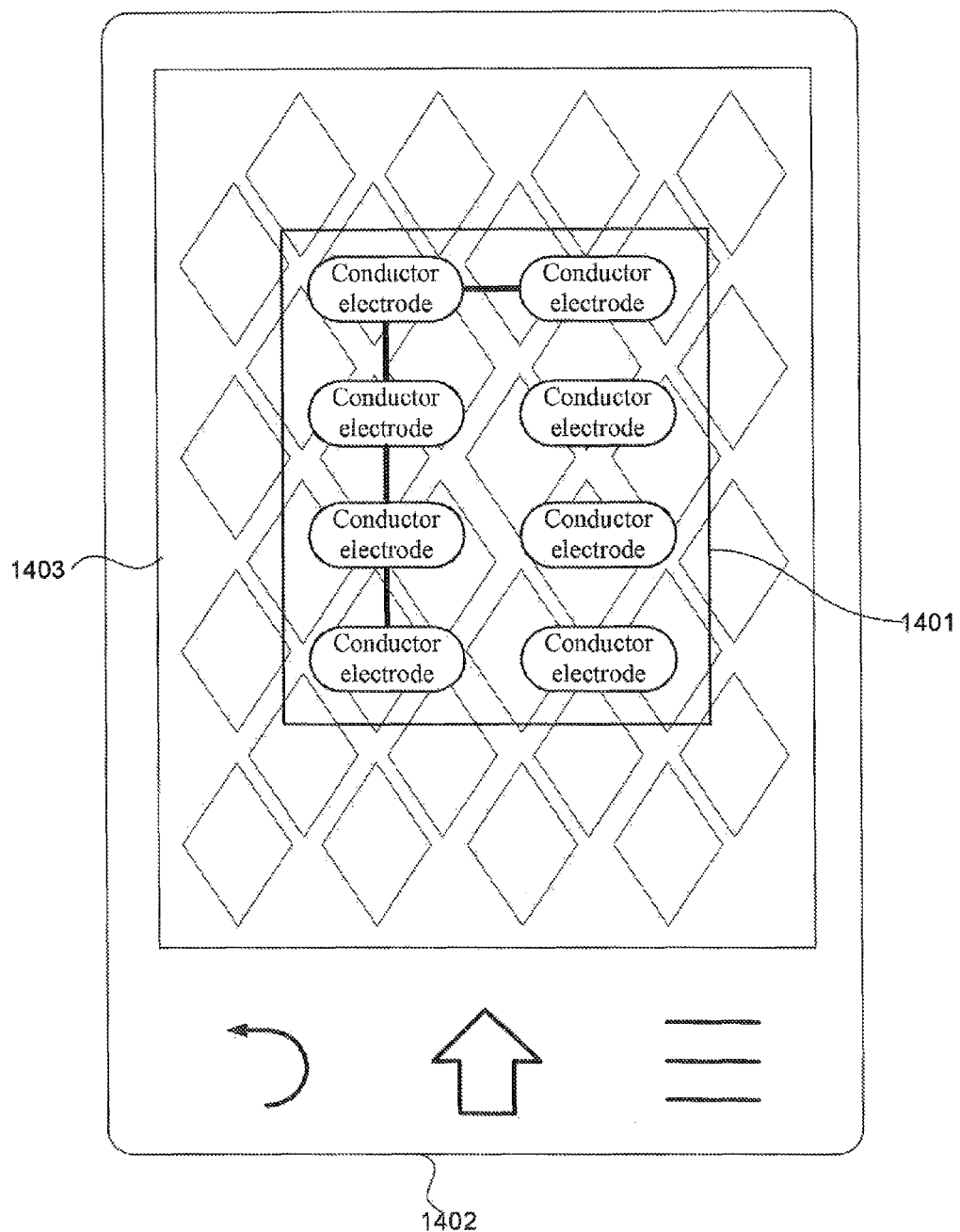
FIG. 14 illustrates a schematic depicting a system for identifying ID according to a preferred embodiment of the present invention.

FIG. 14 illustrates a schematic depicting a system for identifying ID according to a preferred embodiment of the present invention. Referring to FIG. 14, in this embodiment, the system for identifying ID includes an ID card 1401 and a smartphone 1402. The smartphone 1402 has a touch panel 1403. In this embodiment, the smartphone 1402 has been installed a preset application software. The preset application software is used for detecting ID card 1401. When user want to unlock a preset function of the smartphone 1402, user must put the ID card 1401 close to the touch panel 1403 of the smartphone 1402. And then the touch panel reads the capacitive distribution of the conductor electrodes of the ID card 1401 to determine the ID of the ID card. When the ID conforms to the ID of the preset application software, the preset function of the smartphone would be unlocked by the preset application software. The preset function may be a financial transaction, making phone call, and so on. As such, when user loses the smartphone accidentally, it can prevent data theft, phone fraud or unauthorized transactions by some unscrupulous people.

In abovementioned embodiments, it only describes one application of the present invention. The ID card of the present invention also can be used as an access card or any device that requires authentication of identity. In addition, the ID card of the present invention also can be used for a card game or as a toy card. For example, if the toy or the arcade game machine carries a card reader, when the toy reads different cards, the toy would have different reactions, make different moves or various attack abilities so as to increase the fun of the game.

In the abovementioned embodiment, the smartphone 1402 is taken as an example. People having ordinary skill in the art should know that the tablet computer or the laptop computer with touch panel also can be the card reader. Furthermore, in the abovementioned embodiment, the touch panel of the smartphone is served as the card reader, however, people having ordinary skill in the art should know that the smartphone can also adopts a plug-in card reader connected to the connection port of the smartphone. Thus, the present invention is not limited thereto.

Moreover, common card game in the market, such as Mushiking, adopts bar code on the back of the card. The arcade game machine has the optical reader to read the bar code to let user to fight with another user. In the present invention, the low cost conductor electrode is adopted, no bar code is required. Thus, the space for the bar code can be adopted for other purposes. Thus, it may increase the elegance of the game card.

In summary, the spirit of the present invention is to use the arrangements and/or combinations of conductor electrodes to form different pattern. The card reader determines the positions or the number of the conductor electrodes in the card through its sensing device, such that the ID of the ID card can be determined. The sensing device may be a capacitive sensor, metal sensor or an electric field sensor. Sine it is only to arrange or to combine the conductor electrode(s) in the card to represent the ID, the cost ID card can be reduced.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An ID card, identified by a card reader, wherein the ID card and card reader comprises:
   a card case;
   a plurality of conductor electrodes, disposed on and arranged in the card case, wherein a plurality of first specific conductor electrodes of the conductor electrodes are electrically connected to each other to represent a specific ID;
   wherein the card reader comprises a surface-shaped sensor,
   wherein the surface-shaped sensor determines the specific ID of the ID card according to the shape configured by the first specific conductor electrodes sensed by the surface-shaped sensor when the ID card is close to the card reader,
   wherein the conductor electrodes are arranged to a N×M matrix, and the surface-shaped sensor comprises:
   a signal transceiver matrix, comprises at least N×M signal transceivers, wherein positions of signal transceivers are corresponding to positions of the conductor electrodes,
   wherein a detection period is divided into N×M time slots,
   wherein in the (i,j)th time slot, (i,j)th signal transceiver emits a electric field signal, and the rest of signal transceivers are served as receivers to receive the electric field signal,
   wherein one of the first conductor electrodes receives the electric field signal, the signal transceivers respectively corresponding to the rest of first conductor electrodes receive the electrical field signal, such that the card reader determines the shape configured by the first conductor electrodes to determine the specific ID of the ID card,
   wherein N, M, i, j are integers.

2. The ID card according to claim 1, further comprising:
   a grounding conductor, wherein the first specific conductor electrodes are electrically connected to the grounding conductor.

3. The ID card according to claim 1, wherein the surface-shaped sensor of the card reader is a surface-shaped capacitive sensor,
   wherein the surface-shaped capacitive sensor is used for detecting a plurality of capacitances between each of conductors and the surface-shaped capacitive sensor, and accordingly determines the shape configured by the first specific conductor electrodes to determine the specific ID of the ID card.

4. The ID card according to claim 1, wherein the surface-shaped sensor of the card reader is a surface-shaped capacitive sensor,
   wherein the surface-shaped sensor is used for detecting whether each of a plurality of capacitances between each of conductors and the surface-shaped capacitive sensor are respectively greater than a threshold capacitance or not, such that the shape configured by the first specific conductor electrodes is determined and the specific ID of the ID card is determined.

5. The ID card according to claim 1, wherein a plurality of second specific conductor electrodes in the conductor electrodes are electrically connected to each other, wherein the first specific conductor electrodes are not electrically connected to the second specific conductor electrodes,
   wherein one of the second conductor electrodes receives the electric field signal, the signal transceivers respectively corresponding to the rest of second conductor electrodes receive the electrical field signal, such that the card reader determines the shapes configured by the second conductor electrodes and the first conductor electrodes to determine the specific ID of the ID card.

6. The ID card according to claim 1, wherein the card reader is a smartphone, and the surface-shaped sensor is a touch panel of the smartphone.

7. A system for identifying ID, comprising:
   at least a ID card, wherein each ID card comprises:
   a card case; and
   a plurality of conductor electrodes, disposed on and arranged in the card case, wherein a plurality of first specific conductor electrodes of the conductor electrodes are electrically connected to each other to represent a specific ID; and a card reader, for performing identification of ID, wherein the card reader comprises:
   a surface-shaped sensor, wherein the surface-shaped sensor determines the specific ID of the ID card according to the shape configured by the first specific conductor electrodes sensed by the surface-shaped sensor when the ID card is close to the card reader,
   wherein the conductor electrodes are arranged to a N×M matrix, and the surface-shaped sensor comprises a signal transceiver matrix, comprises at least N×M signal transceivers, wherein positions of signal transceivers are corresponding to positions of the conductor electrodes,
   wherein a detection period is divided into N×M time slots,
   wherein in the (i,j)th time slot, (i,j)th signal transceiver emits a electric field signal, and the rest of signal transceivers are served as receivers to receive the electric field signal,
   wherein one of the first conductor electrodes receives the electric field signal, the signal. transceivers respectively corresponding to the rest of first conductor electrodes receive the electrical field signal, such that the card reader determines the shape configured by the first conductor electrodes to determine the specific ID of the ID card, and wherein N, M, i, j are integers.

8. The system according to claim 7, wherein the ID card further comprises:

a grounding conductor, wherein the first specific conductor electrodes are electrically connected to the grounding conductor.

9. The system according to claim 7, wherein the surface-shaped sensor of the card reader is a surface-shaped capacitive sensor, wherein the surface-shaped capacitive sensor is used for detecting a plurality of capacitances between each of conductors and the surface-shaped capacitive sensor, and accordingly determines the shape configured by the first specific conductor electrodes to determine the specific ID of the ID card.

10. The system according to claim 7, wherein the surface-shaped sensor of the card reader is a surface-shaped capacitive sensor, wherein the surface-shaped sensor is used for detecting whether each of a plurality of capacitances between each of conductors and the surface-shaped capacitive sensor are respectively greater than a threshold capacitance or not, such that the shape configured by the first specific conductor electrodes is determined and the specific ID of the ID card is determined.

11. The system according to claim 7, wherein a plurality of second specific conductor electrodes in the conductor electrodes are electrically connected to each other, wherein the first specific conductor electrodes are not electrically connected to the second specific conductor electrodes, wherein one of the second conductor electrodes receives the electric field signal, the signal transceivers respectively corresponding to the rest of second conductor electrodes receive the electrical field signal, such that the card reader determines the shapes configured by the second conductor electrodes and the first conductor electrodes to determine the specific ID of the ID card.

12. The system according to claim 7, wherein the card reader is a smartphone, and the surface-shaped sensor is a touch panel of the smartphone.

* * * * *